(12) United States Patent
Cohen (10) Patent No.: US 9,626,493 B2
(45) Date of Patent: Apr. 18, 2017

(54) CONTINUOUS DIGITAL CONTENT PROTECTION

(71) Applicant: Microsoft Technology Licensing, LLC, Redmond, WA (US)

(72) Inventor: Yair Cohen, Tel Avi (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/913,427

(22) Filed: Jun. 8, 2013

(65) Prior Publication Data

US 2014/0366159 A1 Dec. 11, 2014

(51) Int. Cl.
*G06F 21/10* (2013.01)
*G06F 21/31* (2013.01)
*G06F 21/16* (2013.01)

(52) U.S. Cl.
CPC ............. *G06F 21/31* (2013.01); *G06F 21/10* (2013.01); *G06F 21/16* (2013.01); *G06F 2221/2117* (2013.01)

(58) Field of Classification Search
CPC ..................................................... G06F 21/30
USPC ............................................ 726/28; 455/517
See application file for complete search history.

(56) References Cited

U.S. PATENT DOCUMENTS

| | | | |
|---|---|---|---|
| 4,821,118 A * | 4/1989 | Lafreniere | G07C 9/00079 348/150 |
| 6,111,517 A * | 8/2000 | Atick et al. | 340/5.83 |
| 6,189,105 B1 * | 2/2001 | Lopes | 726/20 |
| 6,758,394 B2 * | 7/2004 | Maskatiya et al. | 235/379 |
| 8,050,698 B2 * | 11/2011 | Seligmann et al. | 455/517 |
| 8,261,090 B1 | 9/2012 | Matsuoka | |
| 8,294,550 B2 * | 10/2012 | Sasakuma | 340/5.2 |
| 8,355,951 B1 | 1/2013 | Daniel | |
| 8,364,971 B2 | 1/2013 | Bell et al. | |
| 8,370,639 B2 | 2/2013 | Azar et al. | |
| 8,742,927 B2 * | 6/2014 | Olivier | 340/541 |
| 2006/0140452 A1 * | 6/2006 | Raynor et al. | 382/115 |
| 2008/0140433 A1 * | 6/2008 | Levy | G06F 21/10 705/26.1 |

(Continued)

FOREIGN PATENT DOCUMENTS

EP 1602999 A1 12/2005

OTHER PUBLICATIONS

Vatsa et al. (Robust biometric image watermarking for fingerprint and face template protection, IEICE Electronics Express, vol. 3. No. 2, pp. 23-28, Published Jan. 25, 2006).*

(Continued)

*Primary Examiner* — Oleg Korsak
(74) *Attorney, Agent, or Firm* — Workman Nydegger (57) ABSTRACT

Data from one or more sensors of a computing device can be employed to provide continuous protection of digital content. After user authentication and authorization, sensor data can be utilized to control access to protected content. More specifically, sensor data can be employed as a basis for initially providing an authorized user access to protected content and subsequently terminating access to the protected content. For additional security, content can be embedded with user identifying information in the form of a watermark. Further, such user identifying information can be provided to a content owner identifying one or more users who viewed the content.

22 Claims, 10 Drawing Sheets

(56) References Cited

U.S. PATENT DOCUMENTS

| | | |
|---|---|---|
| 2009/0239581 A1* | 9/2009 | Lee ............................ 455/556.2 |
| 2010/0205667 A1* | 8/2010 | Anderson et al. .............. 726/19 |
| 2011/0067098 A1 | 3/2011 | Nelson et al. |
| 2012/0120186 A1* | 5/2012 | Diaz .................... H04N 5/2258 348/36 |
| 2012/0235790 A1 | 9/2012 | Zhao et al. |
| 2013/0132271 A1 | 5/2013 | Daniel |

OTHER PUBLICATIONS

Wang et al. (A Novel Authentication Scheme of the DRM System Based on Multimodal Biometric Verification and Watermarking Technique, IEEE 2008, pp. 212-215).*

Bowyer et al. (Face Recognition Technology and the Security Versus Privacy Tradeoff, Aug. 5, 2003).*

Nash, Mike, "Microsoft RMS—A Step Forward in Secure Information Delivery", Retrieved at <<http://technet.microsoft.com/en-us/library/dd277361.aspx>>, Dec. 1, 2003, pp. 4.

Jennifer, Bergen, "Apple Offering Face Detection APIs to Developers in iOS 5", Retrieved at <<http://www.geek.com/apple/apple-offering-face-detection-apis-to-developers-in-ios-5-1406783/>>, Jul. 27, 2011, pp. 2.

Unknown, "Apple iOS Dev Center", Retrieved at <<https://deyeloperapple.com/devcenter/ios/index.action>>, Apr. 23, 2013, p. 1.

Van Wyk, et al., "Development of a Real-Time Face Recognition System for Access Control", Retrieved at <<http://www.cs.uwc.ac.za/~jconnan/publications/Paper%20103%20-%20van%20Wyk.pdf>>, Apr. 15, 2013, pp. 5.

Unknown, "Face Recognition SDK Comparison", Retrieved at <<http://developers.mobily.com.sa/community/portal/site2.action?s=devsite&c=detailNewsInfo&lang=en&t=web&newsld=146>>, Feb. 6, 2013, pp. 2.

"International Preliminary Report on Patentability Issued in PCT Application No. PCT/US2014/040782", Mailed Date: Aug. 26, 2015, 6 Pages.

"International Search Report and Written Opinion Issued in PCT Application No. PCT/US2014/040782", Mailed Date: Oct. 9, 2014, 9 Pages.

* cited by examiner

CONTINUOUS DIGITAL CONTENT PROTECTION

BACKGROUND

Digital rights management (DRM) is a general term that describes any technology that provides access control with respect to digital content. Digital content owners utilize DRM to control access and use of content. Generally, DRM involves digitally locking content to prevent unauthorized individuals from viewing the content. Digital locks are implemented utilizing encryption. More specifically, content is encrypted with an encryption algorithm, and in order to access unencrypted content, a key is required. For example, a user can be authenticated based on a user name and passcode, and if an authenticated user is authorized to access content, a key is provided that enables the encrypted content to be decrypted.

In one particular case, DRM is applied to documents such as word processing documents, spreadsheets, or e-mails. Here, a document creator applies DRM to protect documents sent to others. In this manner, the document creator, or owner, can prevent sensitive information from being accessed and used by unauthorized people.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to continuous digital content protection. Data acquired from one or more sensors can be employed to control access to protected content after authentication and authorization. More specifically, sensor data can be utilized as a basis for initially providing access to protected content and subsequently terminating access to the protected content. Different levels of protection are also afforded. In accordance with one level of protection, data from the one or more sensors is used to detect the presence or absence of one or more users, or in other words, people that are able to access, use, or observe protected content. Based on the number of users, access to protected content can be halted. In one embodiment, the number of users can be detected utilizing face detection technology in conjunction with a camera of a computing device. For instance, if more than one or less than one user is detected, the protected content can be locked. Additional mechanisms are also disclosed for further security including watermarking and auditing.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

A significant issue with digital rights management is a lack of control after content is accessible to a user. For example, after access has been granted to view content, a user can copy data, for example by way of a screenshot or picture taken with a camera of the screen, or show content to others. Furthermore, in the context of mobile devices, the device screen can potentially be photocopied or scanned. In any event, protected content can be made available to unauthorized users without the content owner ever knowing that such undesirable behavior has taken place.

Details below generally pertain to continuous digital content protection. One or more sensors of a computing device can be monitored in conjunction with presentation of protected digital content on the device. Data obtained from the one or more sensors can be utilized as a basis to initially present and subsequently halt presentation of protected digital content. As a result, behavior that threatens to compromise protected content can at least be mitigated.

Different levels of protection can also be utilized, for example based on the sensitivity of protected content, among other things. In one level, the number of users of protected content can indicate unauthorized or potential unauthorized access. In one embodiment, a front facing camera can be monitored and a face detection algorithm employed to detect the number of people capable of at least observing the protected content. For example, if less than or more than one person is detected, protected content will not be presented or will be closed and thus no longer presented. Other levels of protection providing more or less protection are possible as well as different manners of protecting content at the same or similar level.

Additional security mechanisms can also be employed including watermarking, and auditing, among other things. A watermark including information that identifies a user can be injected within the protected content to prevent or deter unauthorized copying, for instance. Further, information indicative of a user can be logged and subsequently employed to facilitate identification of unauthorized access.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
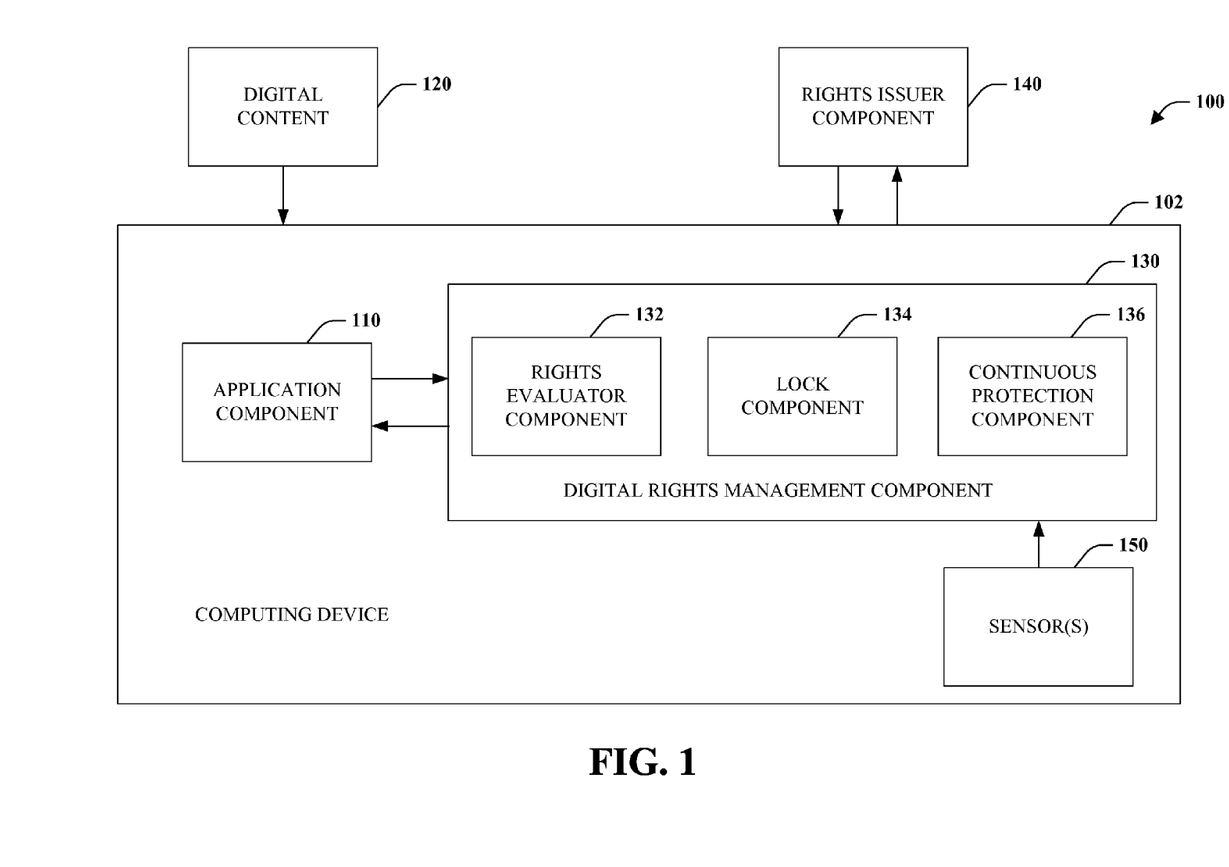
FIG. 1 is a block diagram of a content protection system.

Referring initially to FIG. 1, a content protection system 100 is illustrated. The system 100 includes a computing device 102 such as, but not limited to, a desktop computer, laptop computer, tablet, mobile phone, set-top box, or game console as described in further detail later herein. More specifically, the computing device 102 can include an application component 110 configured to display, play, execute, or otherwise present digital content 120, wherein digital content can include text, images, audio, video, or a software application, among other things available in a digital format. By way of example, and not limitation, the application component 110 can embodied as a word processing application and the digital content 120 can be a word processing document. The application component 110 is communicatively coupled with digital rights management component 130, configured to allow and prevent access to a secure or protected digital content based on rights of a user of the computing device 102.

More specifically, the digital rights management component 130 includes rights evaluator component 132 and lock component 134. The rights evaluator component 132 is configured to request permission to access secure digital content from rights issuer component 140. For example, the rights evaluator component 132 can receive, retrieve or otherwise obtain or acquire user credentials, or, in other words, authentication information, for a user of the computing device 102. The user credentials or authentication information can be any information that can establish the identity of a user, such as but not limited to user name and password, biometrics such as fingerprints, voice recognition, or retinal scans, or presentation of a key, among other things. This information can be provided in conjunction with a request for permission sent to the rights issuer component 140. The rights issuer component 140 can be a network accessible component as part of a rights management server, for instance.

After receipt of the request, the rights issuer component 140 can seek to authenticate the user based on authentication information sent with the request. Authentication is the process of confirming the identity of a user, for example, based on something the user knows (e.g., password, personal identification number . . . ) and/or something the user has (e.g., security token, computing device, ID card . . . ), among other things. If the rights issuer component 140 validates the identity of a user based on the authentication information, the rights issuer component 140 can next determine whether the user is authorized to access digital content for which the request pertains. If the user is authorized, the rights issuer component 140 grants permission for the user to access secure digital content in a response to the request for permission. In operation, the rights issuer component 140 returns a security token or key.

Upon receipt of permission, the digital rights management component 130 can allow access to a piece of secure digital content consistent with the granted permission. More particularly, the lock component 134 can unlock the digital content 120 so that the application component 110 can display, play, execute, or otherwise present the digital content to the user. In the scenario in which the digital content 120 is secure by way of encryption, the lock component 134 can utilize a security key provided by the rights issuer component 140 to decrypt the digital content 120.

Absent further functionality, subsequent protection of the digital content 120 relies on the user that has access to the digital content 120. However, the user could capture the content with screenshot or take a picture of the displayed digital content, or show the content to others. Furthermore, in the context of mobile devices, the device screen can potentially be photocopied or scanned. In any event, not only is protected content available to unauthorized users it can be provided without the owner of the digital content ever knowing that such undesirable behavior took place.

The continuous protection component 136 seeks to mitigate undesirable behaviors that potentially expose protected content to unauthorized individuals. More specifically, the continuous protection component 136 is configured to prevent or halt presentation of or access to digital content 120 by way of the application component 110 in particular situations in which the security of the digital content 120 can be compromised. For example, the continuous protection component 136 can employ lock component 134 to prevent unlocking of the digital content 120. Additionally or alternatively, the continuous protection component 136 can cause the application component 110 to close the digital content 120 or close a running instance of the application itself.

Many situations present the opportunity for unauthorized use or compromised security. One situation involves the number users, or in other words, people that are able to access, use, or observe protected content. For instance, when a single user is not detected this can potentially signify that the computing device is left alone or being passed to an unauthorized user or the content is being copied (e.g., via photocopier, scanner, or picture). When more than one person is detected, the potential exists to share the content with unauthorized individuals. Other situations are possible and contemplated including location such as a case where a user is located outside a particular secure area, among other things.

The continuous protection component 136 can employ one or more sensors 150 to monitor various conditions automatically and continuously that are associated with behavior that has the potential to expose protected content to unauthorized users. The sensors 150 can be included within the computing device 102 (e.g., internal) or otherwise accessible to the computing device 102 (e.g., external-wired or wireless). By way of example, and not limitation, the sensors 150 can include a camera, microphone, accelerometer, gyroscope, and global positioning system (GPS) receiver, proximity sensor, among many others that measure various physical quantities (e.g., location, proximity, pressure temperature, humidity, heart rate, gaze . . . ).

Figure 2:
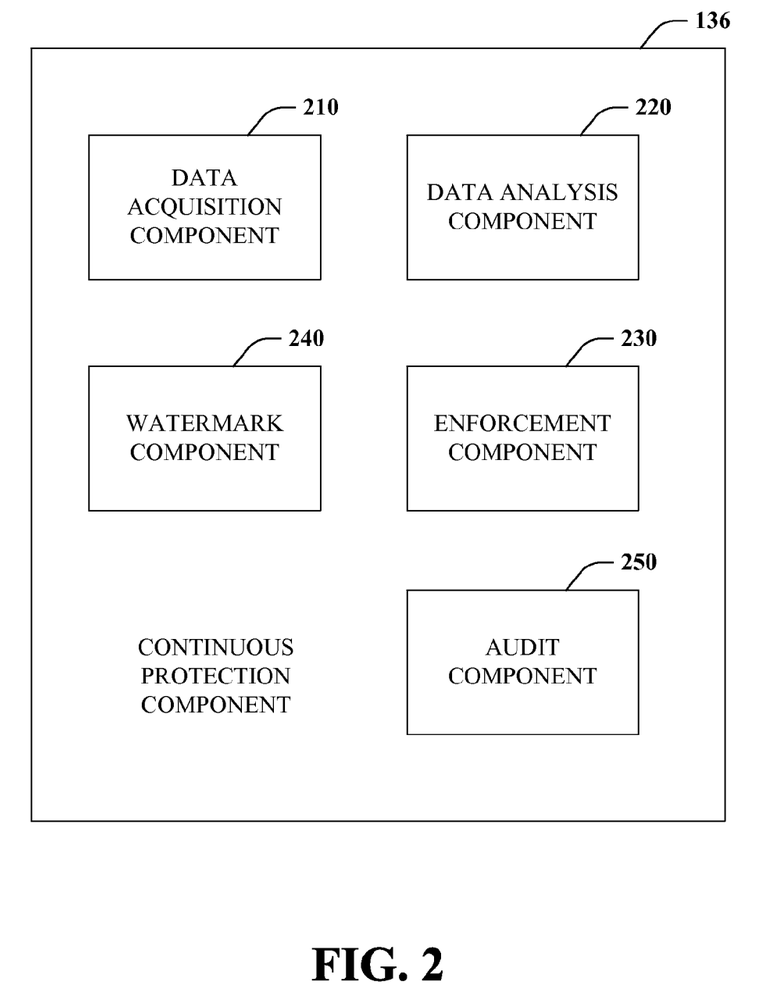
FIG. 2 is a block diagram of a representative continuous protection component.

FIG. 2 depicts a representative continuous protection component 136. Operation of the continuous protection component 136 is continuous, wherein continuous means the protection is extended in conjunction with authentication and authorization as well as after authentication and authorization. Furthermore, the frequency at which data is acquired and analyzed with respect to provisioning continuous protection can vary from intermittent to continual, or, in other words, in substantially real time. However, anything less than acquiring and processing data in substantially real time can provide holes in protection that could be exploited.

The continuous protection component 136 includes data acquisition component 210, data analysis component 220, and enforcement component 230. The data acquisition component 210 is configured to receive, retrieve, or otherwise obtain or acquire data from one or more sensors, or, in other words, sensor data. The data analysis component 220 is configured to analyze the sensor data and detect or infer one or more conditions that compromise protected digital content. The enforcement component 230 is configured to intervene and prevent unauthorized use or access of protected digital content. Accordingly, the enforcement component 230 can be invoked upon detection of one or more undesirable conditions as detected or inferred by the data analysis component 220 and based on data supplied by the data acquisition component 210.

By way of example, and not limitation the data acquisition component 210 can obtain one or more pictures or video from a front-facing camera of a computing device. The data analysis component 220 can analyze the pictures or video to determine the number of faces that are present utilizing face detection technology and thus determine the number people that can potentially access, use, or observe the content. Subsequently, the data analysis component 220 can determine whether the number faces violates one or more predetermined conditions. For instance, conditions may specify that less than one face is detected or more than one face is detected indicate a content compromising situation. If detected, the enforcement component 230 can prohibit presentation of digital content or terminate presentation of the digital content, for instance by ensuring secure digital content is not unlocked or causing the digital content or application instance presenting digital content to close.

The continuous protection component 136 is not limited to utilizing images or video from a camera to detect users. In other instance, an accelerometer can employed. An accelerometer can be sensitive enough to detect small movements produced when a real person holds a mobile computing device versus when the device is left on a table, for example. In another instance, a heartbeat sensor can be utilized, such that if a heartbeat is detected at least one user is present. Still further yet, a proximity sensor can be utilized to detect one or more people within a distance of a computing device what would allow them to view content. Moreover, a combination of data from multiple sensors can be used to detect the number of users of protected content.

Furthermore, other situations exist where behavior can compromise protected content. For instance, the accelerometer can be employed to detect a harsh movement potentially associated with someone stealing the computing device. In another instance, a GPS receiver or other location sensor can detect whether a user is in a secure location such as at his desk at work or an insecure location like a coffee shop and take different actions based on location. For example, content may not be locked or made inaccessible in the presence of others in a secure location while the content would be locked when the user is outside a secure location.

The continuous protection component 136 also includes functionality to deter unauthorized access or use as well as enable a content owner (e.g., content creator) or the like to track sources of leaks and identify unauthorized users. To that end, the continuous protection component 136 includes watermark component 240. The watermark component 240 is configured to embed a visible or invisible watermark into secure digital content. Moreover, the watermark component 240 can inject identifying information about a user that accesses or uses the digital content, as opposed to, or in addition to, conventional use of watermarks to identify content owners. Such information can be acquired from sensor data gathered from one or more sensors. For example, a picture of a user captured by a front-facing camera can be inserted in the background or overlaid on top of the secure digital content. Other exemplary information could also be utilized including location, time, and heart rate. In one instance, the watermark component 240 can inject both a visible and invisible watermark. Such a watermark can enable the source of a leak to be identified quite easily, and thus discourage at least unauthorized copying of protected content. For example, if protected content somehow ends up on public forum, the watermark can be utilized to identify the authorized user that at least allowed copying of protected content.

The continuous protection component 136 also includes audit component 250. The audit component 250 can make information captured for a watermark among other information indicative of a user available to a content owner, agent, or the like to allow the individual to verify a person that viewed and potentially exposed protected content, for example.

Figure 3:
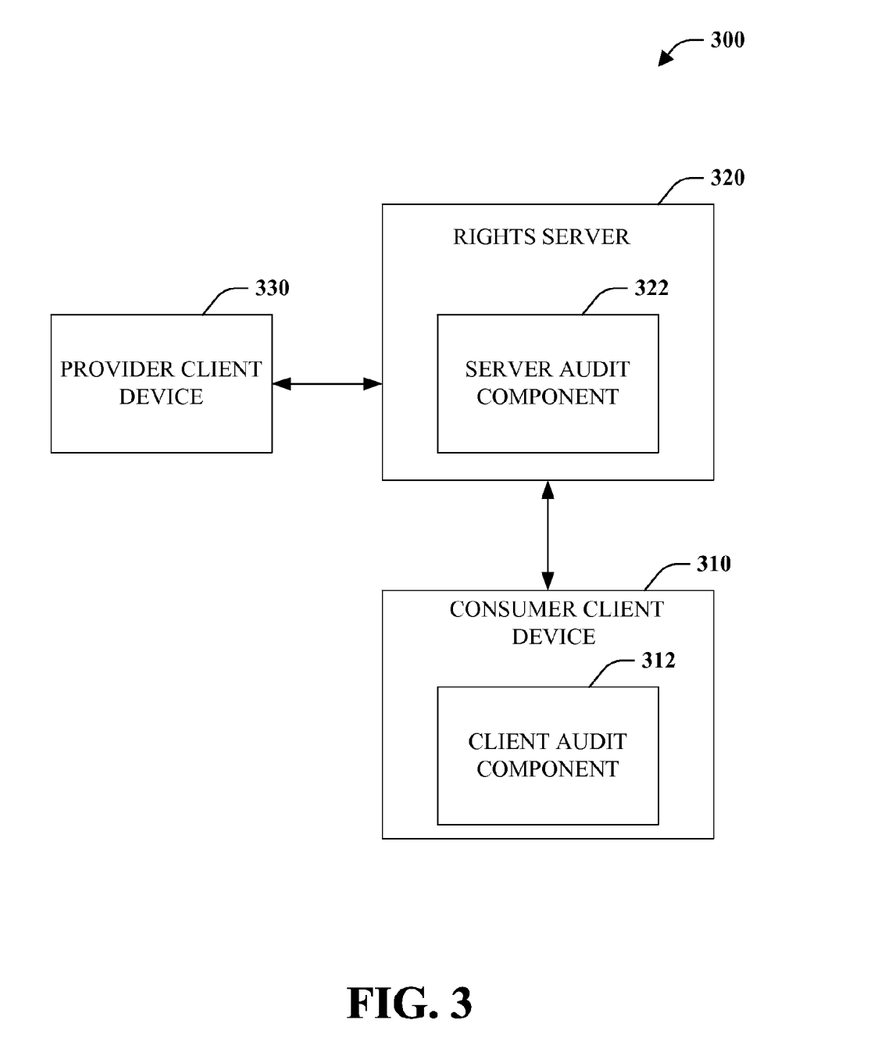
FIG. 3 is a block diagram of an exemplary audit system.

Turning attention to FIG. 3, an exemplary audit system 300 is illustrated. As shown, the system 300 includes a consumer client device 3, a rights server 320, and a provider client device. The consumer client device 310 is a computing device of a user that consumes digital content provided by another individual or entity employing the provider client device. The rights server 320 can be employed as an intermediary that brokers protected content between a provider and a consumer. For instance, a provider utilizing the provider client device 330 can employ the rights server to digitally lock content utilizing encryption and specify users or entities authorized to access and use protected content. A consumer utilizing the consumer client device 310 can then interact with the rights server 330 to acquire permission to access and use the protected content. Moreover, the consumer client device 310 includes a client audit component 312 that can receive or retrieve information regarding a user and/or circumstances surrounding access to protected content and provide the information to, or make the information accessible by, the server audit component 322. The server audit component 322 is configured to make such data accessible to the owner of content, for instance via the provider client device 330. By way of example, the server audit component can provide a picture gallery of images of users who accessed the content and optionally additional information such as user name or identifier, location, and time of access, among other things. In this manner, the owner of protected content can see who accessed his/her protected content, and understand easily if an unauthorized person accessed the protected content.

Furthermore, the server audit component 322 can notify a user if it can be determined or inferred that protected content is being misused. In accordance with one embodiment, a database can be generated of all people who opened a piece of protected content. Additionally, a document can be opened multiple times a day by various users. Accordingly, it could be burdensome for a content owner to review all images. This can be automated by the server audit component 322. For example, if there are various like images associated with an identity and one that appears distinct, this can be detected by comparing images. Here, face recognition technology may be employed to identify and distinguish between people. Moreover, a content owner can be alerted to this potential issue.

FIGS. 4A-C and 5 provide exemplary screenshots that illustrate operation of one or more aspects of the subject disclosure. These screenshots are associated with one particular embodiment of the invention for clarity and understanding, and are not intended to limit the scope of the appended claims thereto. Furthermore, as screenshots, various graphical and textual elements are presented in a particular layout. However, it is to be appreciated that the content and text can be presented in numerous combinations and positions, and thus the screenshots are not meant to limit the subject disclosure to those examples provided.

Figure 4A:
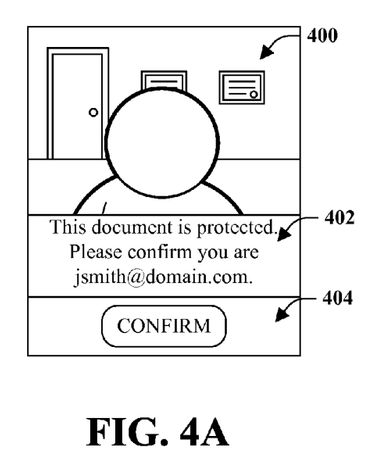
FIGS. 4A-C are exemplary screenshots depicting disclosed aspects.

FIG. 4A is a screenshot that can be displayed to a user attempting to access protected content after being authenticated and authorized. If a computing device detects a single user, the user is asked to agree to be photographed for auditing purposes. In other words, the user can agree to be photographed as an authorized user of protected content. Picture 400 is captured by a computing device camera; in one instance, the picture 400 corresponds to a frame of a live video capturing a user interacting with a computing device. The picture is presented in the background behind message 402 and confirmation button 404. The message notes that the content to be accessed is protected and requests the confirmation from the user in the picture 400 that the user is indeed an authorized user identified by the email address "jsmith@domain.com." Confirmation can also indicate that the user agrees to be photographed to aid subsequent auditing of access. The confirmation button 404 provides an interface element that allows confirmation by selecting the button. After confirmation, an image of a user is captured and saved, and the user is provided access to protected content.

Figure 4B:
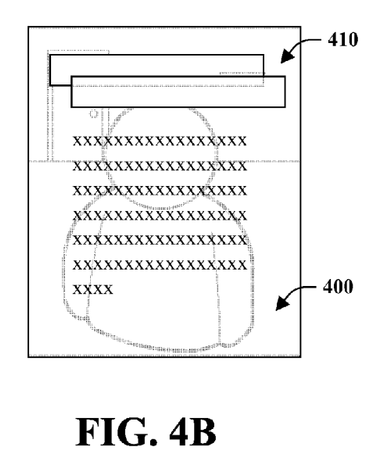

FIG. 4B is a screenshot of accessible content in conjunction with a watermark. After confirmation with respect to FIG. 4A, accessible content 410 is displayed with a visible watermark. In this case, the watermark is the picture 400 captured with respect to FIG. 4A after confirmation. Furthermore, the picture 400 is positioned in the background with the content 410 overlaid on top of the picture 400. However, the watermark need not be a static image. In accordance with one embodiment, the watermark can be a live video. In any event, the watermark injects information about an authorized user within the accessible content. Consequently, any leak of protected content can be traced back to a specific authorized user and any unauthorized user that access content can be identified by way of an auditing process.

Figure 4C:
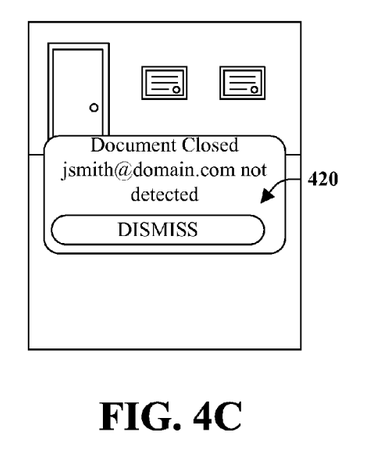

The content 410 can continue to be displayed as long as solely one user is detected. Here, content can be displayed so long as only one face is detected with respect to a series of images or a live video. FIG. 4C is a screenshot that can be displayed if a face cannot be detected. In this instance, the content 410 can be closed and a message 420 presented indicating that the document was closed because a face was not detected, or more specifically that a particular user was not detected.

Figure 5:
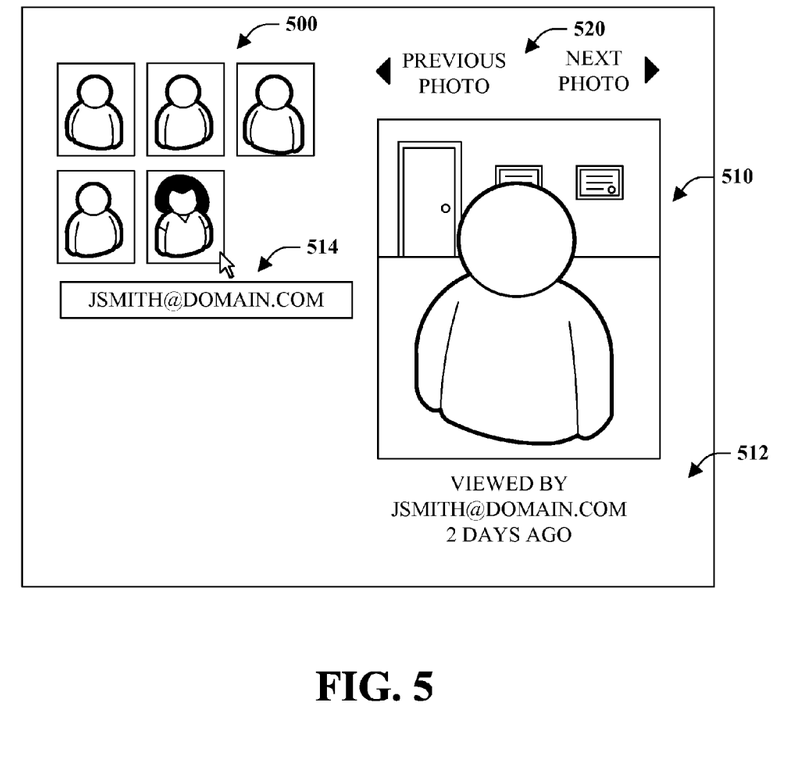
FIG. 5 is an exemplary screenshot depicting a tracking screen for auditing.

FIG. 5 is a screenshot of tracking screen associated with auditing. Thumbnail pictures 500 of users that accessed or otherwise interacted with a particular piece of protected content are displayed. Upon selection of a thumbnail picture 500, a larger picture 510 is presented optionally with additional information 512 such as the identity of the user that viewed the content and when the content was viewed. Such information or a subset of the information can also be provided as a tool tip 514, for example upon positioning a cursor over a particular thumbnail picture. Further, buttons 520 are provided to facilitate picture navigation, for instance to view the next picture or the previous picture. As depicted, four out of the five thumbnail pictures appear the same while one is different. The tool tip 514 indicates that the identity associated with the picture is "jsmith@domain.com," which is the same as the other pictures and potentially the only identity authorized to access the content. Accordingly, it is possible that someone has impersonated "jsmith@domain.com," for example with the corresponding password, and improperly accessed the content.

In accordance with another aspect, the continuous protection component 136 can support multiple levels of protection. For instance, a first level of protection can include that described above with respect to the presence of a single user. More specifically, sensor data can be employed to control access to protected content based on the number of users detected, wherein access is permitted when exactly one user is detected. A second level of protection can involve making the sensor data indicative of a user available to a content owner who can grant or deny permission to access the protected content based on the sensor data. In this case, the first level provides less protection than the second level of protection, but the second level of protection is more burdensome for the content owner than the first level. Nevertheless, the second level may be desirable for content that is highly sensitive, whereas the first level can be appropriate for less sensitive content.

Furthermore, there can be a multitude of levels between the first and second level. By way of example, and not limitation, in addition to employing face detection techniques to identify a number of users as done by the first level, face recognition technology can be utilized to ensure that a single user is the person he/she claims to be. However, face recognition alone suffers from several issues. First, conventionally it can be fooled by a picture of a user. Second, face recognition is difficult, if not impossible, to implement effectively on a user computing device with limited processing power (?). As a result, a server based system may be needed to successfully implement face recognition.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the continuous protection component 136 can implement such mechanism with respect to detecting and inferring protection compromising conditions as a function of sensor data.

In view of the exemplary systems described above, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
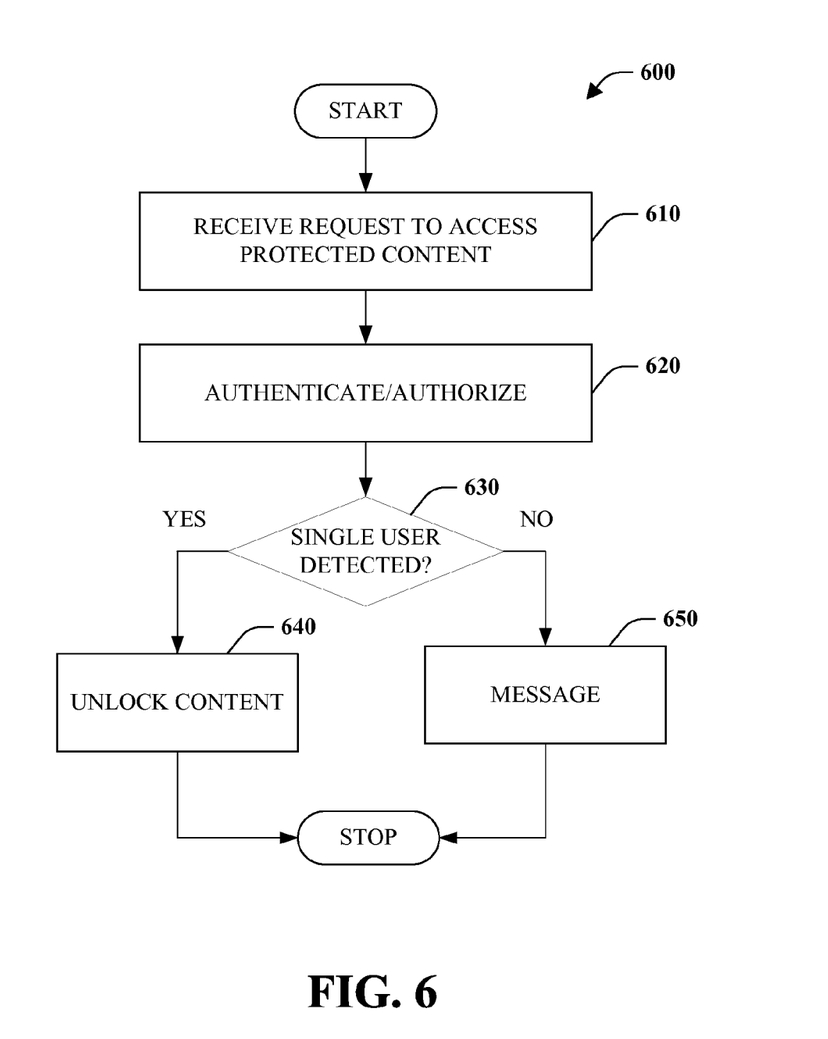
FIG. 6 is a flow chart diagram of a method of unlocking protected content.

Referring to FIG. 6, a method of unlocking protected content 600 is illustrated. At reference numeral 610, a request to access protected content is received, retrieved, or otherwise obtained or acquired. At numeral 620, authentication and authorization is performed, for example by way of a user name and password. Assuming a user identity is authenticated and the user is authorized to access content, the method proceeds to numeral 630, where a determination is made as to whether a single user is detected. In other words, there is not less than one or more than one user detected. Such a determination can be made as a function of one or more sensors associated with a computing device. For instance, images captured by a camera can be utilized to determine the number of users able to view protected content. As another example, one or more sensors that detect motion, location, or sound can be utilized. If a single user is detected ("YES"), protected content can be unlocked and made accessible to a user for example utilizing a key to decrypt the protected content. If a single user is not detected ("NO"), a message 650 can be provided noting that a single user has not be detected and content will remain inaccessible, or the like. Of course, method 600 could also be employed with respect to more than a single user. For instance, two or more authorized users (e.g., employee and manager) may need to be authorized and detected prior to unlocking the content.

Figure 7:
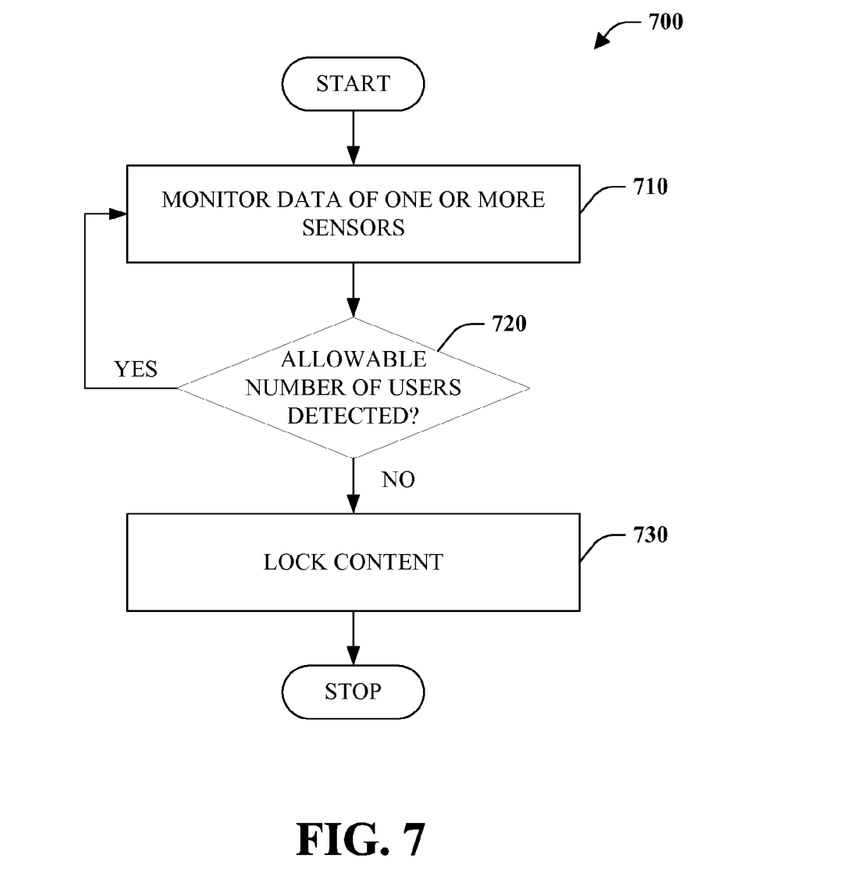
FIG. 7 is a flow chart diagram of a method of locking protected content.

FIG. 7 depicts a method 700 of locking protected content. At reference numeral 710, data from one or more sensors accessible by a computing device is monitored while protected content is accessible to a user of the computing device. Based on data received or retrieved from one or more sensors, a number of users of the content can be detected or inferred. For example, utilizing a sequence of pictures or a live video feed captured by a camera of the computing device, a face detection algorithm can be executed to determine the number of faces at any given time. A determination is made at numeral 720 concerning whether a predetermined, allowable number of users is detected. In accordance with one embodiment, the number of allowable users can be one. However, more than one user can be allowed in conjunction with a lower level of protection. Further, where more than one authorized user needs to be detected prior to initial presentation, that same number of users may be the predetermined, allowable number. If, at numeral 720, an allowable number of users is detected ("YES"), the method loops back to numeral 710 where data from sensors is monitored. However, if, at numeral 720, less than or more than the allowable number of users is detected ("NO"), the method continues at reference 730. At 730, content is locked or otherwise made inaccessible. For example, content can be locked by closing the content or an instance of an application displaying, playing, or otherwise presenting the content. In this manner, one or more users would have to request permission again to access the content.

Figure 8:
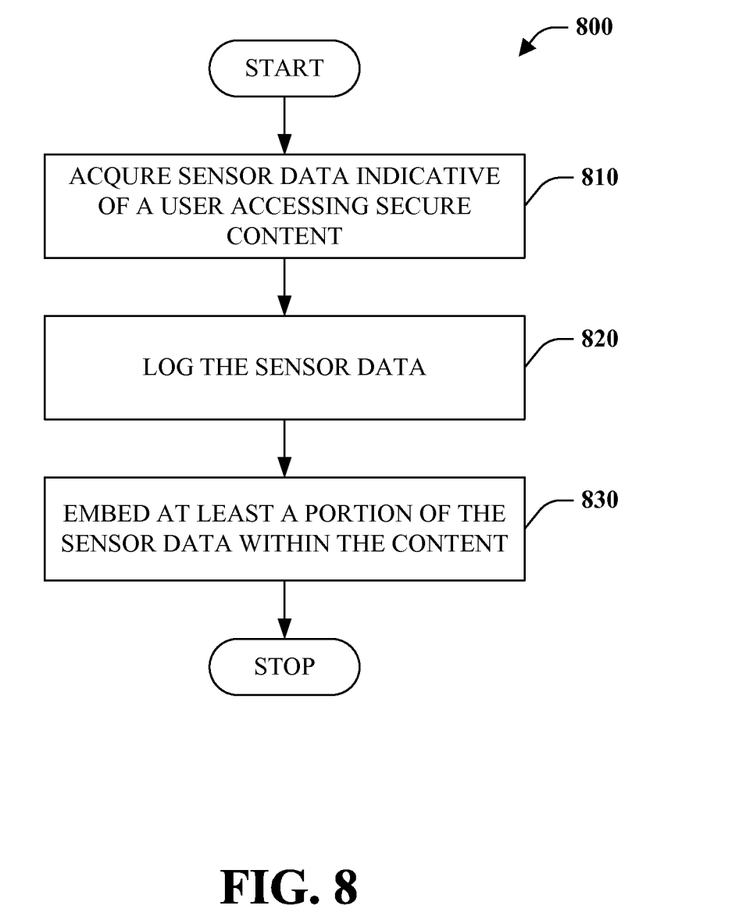
FIG. 8 is a flow chart diagram of a method that facilitates tracking access to protected content.

FIG. 8 illustrates a method 800 of facilitating tracking access to protected content. At reference numeral 810, sensor data indicative of a user at least attempting to access secure content is received, retrieved, or otherwise obtained or acquired. Examples of sensor data include but are not limited to pictures, audio, video, and location. At numeral 820, the sensor data is logged, or recorded, with respect to the at least attempted access to protected content. In this manner, a content owner can review individuals that accessed the data and determine whether there was unauthorized access (for example, a person impersonated or pretended to be an authorized user). At numeral 830, at least a portion of the sensor data that identifies the user is embedded within the content, for instance as a visible or invisible watermark. As a result, should protected content be copied or otherwise shared, the person who accessed the data can be identified.

Figure 9:
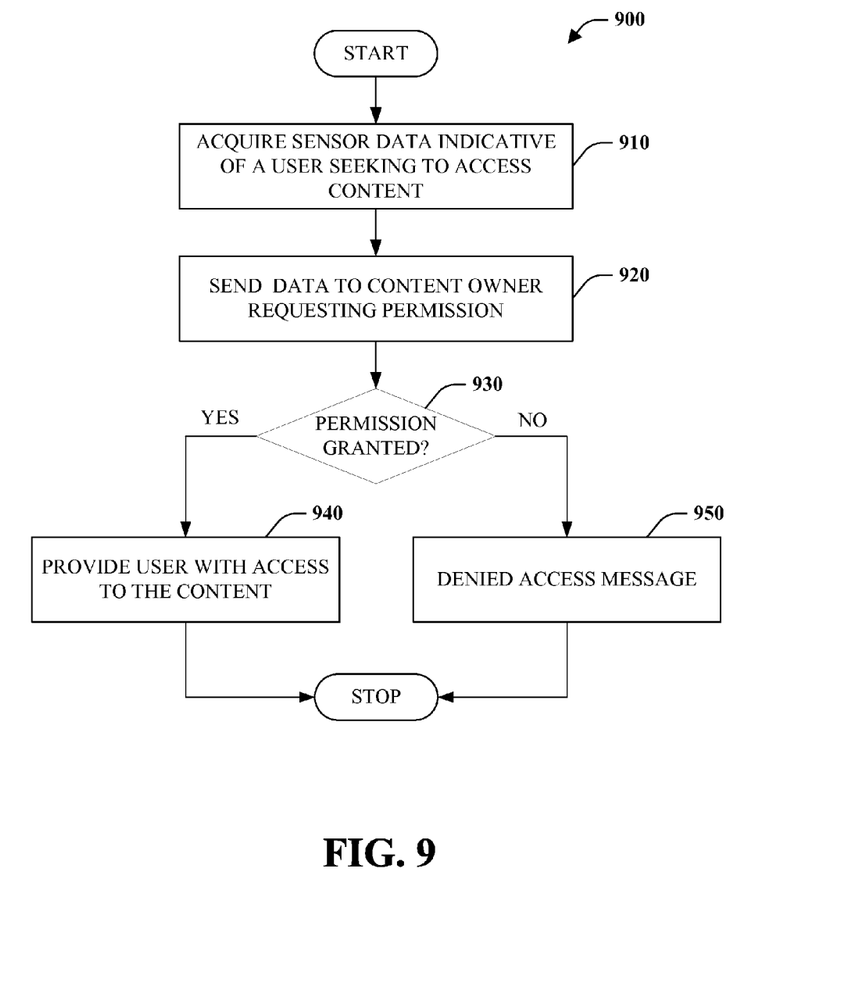
FIG. 9 is a flow chart diagram of a method of controlling access to protected content.

FIG. 9 is a flow chart diagram of a method 900 controlling access to protected content. At reference numeral 910, sensor data indicative of a user seeking access to protected content is received, retrieved, or otherwise obtained or acquired from internal or external computing device sensors. At numeral 920, the sensor data indicative of the user is provided to the owner of the protected content in conjunction with request for permission to access the protected content. By way of example, the identity of the user as well as a picture of the user can be sent to the content owner who can grant or deny access based on whether the picture of the user matches the identity to the knowledge of the content owner. At 930, a determination is made as to whether the content owner granted permission to access the content. If the content owner granted access ("YES"), the user is provided access to the content (box 940) If the content owner did not grand permission ("NO"), a message 950 indicating that access was denied by the content owner can be provided.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
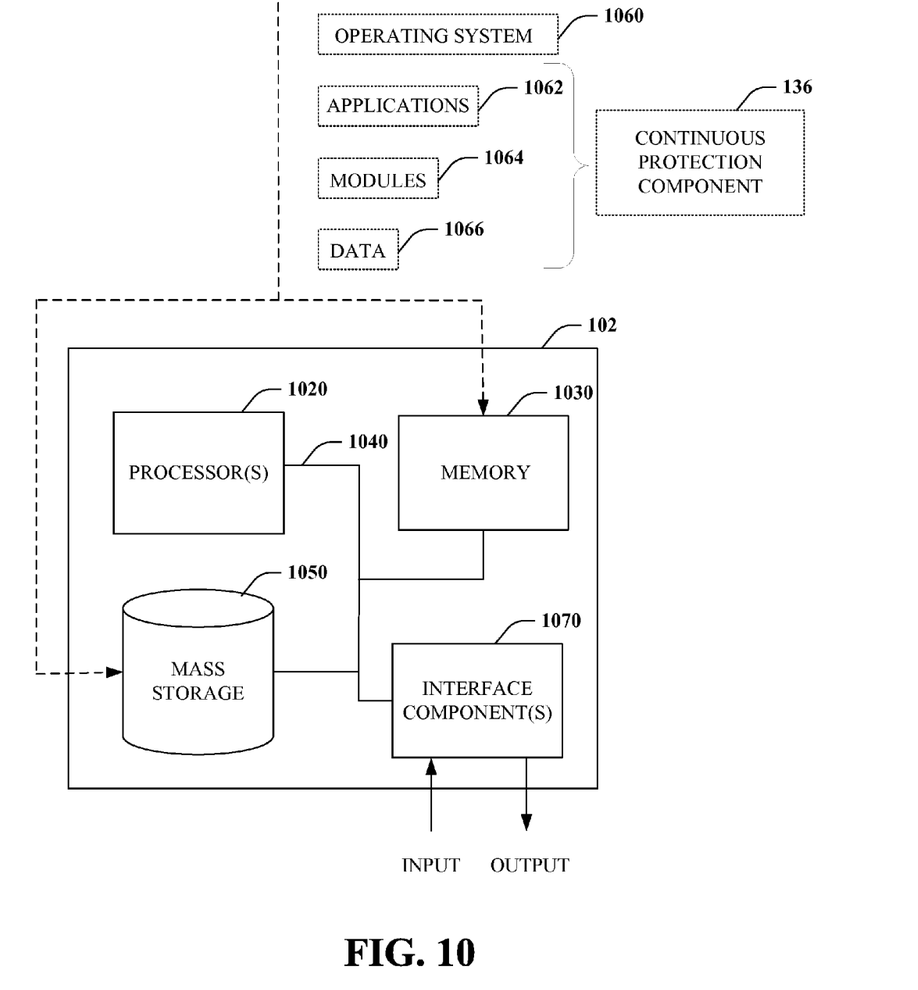
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example general-purpose computer or computing device 102 (e.g., desktop, laptop, tablet, server, hand-held, programmable consumer or industrial electronics, set-top box, game system, compute node . . . ). The computer 102 includes one or more processor(s) 1020, memory 1030, system bus 1040, mass storage 1050, and one or more interface components 1070. The system bus 1040 communicatively couples at least the above system components. However, it is to be appreciated that in its simplest form the computer 102 can include one or more processors 1020 coupled to memory 1030 that execute various computer executable actions, instructions, and or components stored in memory 1030.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration.

The computer 102 can include or otherwise interact with a variety of computer-readable media to facilitate control of the computer 102 to implement one or more aspects of the claimed subject matter. The computer-readable media can be any available media that can be accessed by the computer 102 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that can be used to store, as opposed to transmit, the desired information accessible by the computer 102. Accordingly, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1030 and mass storage 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 102, such as during start-up, can be stored in nonvolatile memory, while volatile memory can act as external cache memory to facilitate processing by the processor(s) 1020, among other things.

Mass storage 1050 includes removable/non-removable, volatile/non-volatile computer storage media for storage of large amounts of data relative to the memory 1030. For example, mass storage 1050 includes, but is not limited to, one or more devices such as a magnetic or optical disk drive, floppy disk drive, flash memory, solid-state drive, or memory stick.

Memory 1030 and mass storage 1050 can include, or have stored therein, operating system 1060, one or more applications 1062, one or more program modules 1064, and data 1066. The operating system 1060 acts to control and allocate resources of the computer 102. Applications 1062 include one or both of system and application software and can exploit management of resources by the operating system 1060 through program modules 1064 and data 1066 stored in memory 1030 and/or mass storage 1050 to perform one or more actions. Accordingly, applications 1062 can turn a general-purpose computer 102 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the continuous protection component 136, or portions thereof, can be, or form part, of an application 1062, and include one or more modules 1064 and data 1066 stored in memory and/or mass storage 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the continuous protection component 136 and/or associated functionality can be embedded within hardware in a SOC architecture.

The computer 102 also includes one or more interface components 1070 that are communicatively coupled to the system bus 1040 and facilitate interaction with the computer 102. By way of example, the interface component 1070 can be a port (e.g., serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 102, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., CRT, LCD, LED, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims

What is claimed is:

1. A computer-implemented method, comprising:
   acquiring an image of a user seeking to access protected content on a computing device from a camera of the computing device after successful authentication and authorization of the user;
   embedding the image into the protected content as a visible watermark;
   initiating presentation of the protected content;
   monitoring one or more sensors of the computing device during presentation of the protected content; and
   halting presentation of the protected content in response to detecting a change in a number of users of the protected content detected as a function of data from the one or more of the sensors.

2. The method of claim 1, wherein halting presentation comprises halting presentation in response to detecting an increase in the number of users from one to greater than one.

3. The method of claim 1 further comprises:
   providing the image to an owner of the protected content; and
   requesting permission to provide access to the protected content based on the image prior to initiating presentation of the protected content.

4. The method of claim 1, further comprising, after halting presentation of the protected content, initiating presentation of the protected content upon successful authentication and authorization of the user.

5. The method of claim 4 further comprises initiating presentation after detecting presence of a single user.

6. The method of claim 1 detecting the change in number of user based on a number of faces detected in an image by a face detection algorithm.

7. The method of claim 1 further comprises halting presentation based on a preselected level of protection associated with the protected content.

8. A computer-readable storage medium having instructions stored thereon that enable at least one processor to perform a method upon execution of the instructions, the method comprising:
   acquiring a first image of a user seeking to open protected content on a computing device from a camera of the computing device after successful authentication and authorization of the user;
   determining how many faces are present in the first image;
   opening the protected content if solely one face is present in the first image; and
   embedding the first image into the protected content as a visible watermark.

9. The computer-readable storage medium of claim 8, the method further comprises:
   capturing a series of images while the protected content is open; and
   closing the protected content automatically based on detection of more than one face in one of the series of images.

10. The computer-readable storage medium of claim 9, the method further comprises closing the protected content automatically based on detection of less than one face.

11. The computer-readable storage medium of claim 8, the method further comprises providing the first image to an auditing component assessable by an owner of the protected content.

12. The computer-readable storage medium of claim 8, the method further comprises:
    providing the first image to an owner of the protected content; and
    requesting permission to provide access to the protected content based on the first image prior opening the protected content.

13. A computer system, comprising:
    one or more processors;
    one or more computer-readable hardware storage devices having stored thereon computer-executable instructions that are executable by the one or more processors to cause the computer system to control access to protected content, and further to cause the computer system to perform at least the following:

receive a request to access protected content, wherein the request includes a set of user credentials;

identify a user based on the received set of user credentials;

using one or more hardware sensors of the computer system, continuously monitor a plurality of factors that are associated with the access of the protected content, wherein the plurality of factors that are monitored includes counting a number of persons having a particular proximity and particular orientation relative to the computer system;

analyze the continuously monitored factors to detect whether one or more conditions that compromise the protected content are present; and upon detecting a condition in which the analysis indicates that the one or more conditions are present, terminate access to the protected content.

14. The computer system of claim 13, wherein the computer executable instructions are also executable to cause the computer system to determine a level of permissions available to the identified user and grant access to the protected content in accordance with the level of permissions available to the user.

15. The computer system of claim 14, wherein granting access to the protected content in accordance with the level of permissions available to the user includes injecting a watermark within the protected content, the watermark including information that identifies the user.

16. The computer system of claim 14, wherein the watermark is one of: a picture of the user, or a video of the user.

17. The computer system of claim 13, wherein the computer system further includes:

an audit component that provides a picture gallery of images of users who have previously accessed the protected content, wherein the picture gallery also includes the following:

a user name for each of the users who have previously accessed the protected content, an access location for each of the users, and a time of access for each of the users.

18. The computer system of claim 13, wherein, upon the condition in which the analysis indicates that the one or more conditions are present, provide a notification to the user prior to terminating access to the protected content.

19. The computer system of claim 13, wherein the plurality of factors that are monitored also includes a geographic location of the computer system.

20. The computer system of claim 13, wherein the computer system further detects additional people that are allowed to be located proximate the one or more hardware sensors and attempts to authorize each of the additional people that are allowed to be located proximate to the one or more hardware sensors.

21. The computer system of claim 13, wherein the continuous monitoring of the plurality of factors occurs substantially in real time, and such that the monitoring is continual rather than intermittent.

22. A computer system, comprising:

one or more processors;

one or more computer-readable hardware storage devices having stored thereon computer-executable instructions that are executable by the one or more processors to cause the computer system to control access to protected content, and further to cause the computer system to perform at least the following:

acquire an image of a user seeking to access protected content on a computing device from a camera of the computing device after successful authentication and authorization of the user;

embed the image into the protected content as a visible watermark;

initiate presentation of the protected content;

monitor one or more sensors of the computing device during presentation of the protected content; and halt presentation of the protected content in response to detecting a change in a number of users of the protected content detected as a function of data from the one or more of the sensors.

* * * * *